US009014287B2

(12) United States Patent
Luo et al.

(10) Patent No.: US 9,014,287 B2

(45) Date of Patent: Apr. 21, 2015

(54) OPEN LOOP MIMO MODE FOR LTE-A UPLINK

(75) Inventors: Xiliang Luo, Northridge, CA (US); Peter Gaal, San Diego, CA (US); Hao Xu, San Diego, CA (US); Tao Luo, San Diego, CA (US); Kapil Bhattad, San Diego, CA (US); Juan Montojo, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 710 days.

(21) Appl. No.: 13/214,024

(22) Filed: Aug. 19, 2011

(65) Prior Publication Data

US 2012/0051453 A1 Mar. 1, 2012

Related U.S. Application Data

(60) Provisional application No. 61/376,639, filed on Aug. 24, 2010.

(51) Int. Cl.

*H04B 7/02* (2006.01)
*H04L 1/02* (2006.01)
(Continued)

(52) U.S. Cl.

CPC ........ *H04L 25/03343* (2013.01); *H04B 7/0413* (2013.01); *H04L 1/0031* (2013.01); (Continued)

(58) Field of Classification Search

CPC . H04L 1/0031; H04L 1/001; H04L 25/03343; H04L 1/08; H04L 5/0003
USPC .......................................... 375/267, 295, 219
See application file for complete search history.

(56) References Cited

U.S. PATENT DOCUMENTS 7,542,734 B2 * 6/2009 Piirainen ........................ 455/101
8,774,224 B2 7/2014 Lee et al.
(Continued)

FOREIGN PATENT DOCUMENTS

WO WO2008098225 A2 8/2008
WO WO2008150148 A2 12/2008
(Continued)

OTHER PUBLICATIONS

International Search Report and Written Opinion—PCT/US2011/048600—ISA/EPO—Feb. 10, 2012.
(Continued)

*Primary Examiner* — Qutbuddin Ghulamali

(74) *Attorney, Agent, or Firm* — Norton Rose Fulbright US LLP

(57) ABSTRACT

A precoding scheme to accommodate user equipment (UEs) having higher Doppler speeds. In such transmission schemes, a different precoding matrix is applied to each orthogonal frequency division multiplex (OFDM) symbol in the transmission stream. Additionally, a downlink control message format is defined to handle assignment of multiple different transmission schemes using the same message format. The downlink control message format includes a control element in one of the message fields along with a set of parameters specifically applicable to the assigned transmission scheme. Based on the value of this control element, the UE sets the specific transmission scheme and determines a set of interpretation rules uniquely associated with that transmission scheme. Using the interpretation rules, the UE is able to read the set of parameters as applied to the selected transmission scheme.

24 Claims, 9 Drawing Sheets

600

602 Identify a selected transmission mode from multiple transmission modes suitable for UE uplink communication.

604 Select a control element associated with the selected transmission mode.

606 Generate a DCI message using the control element and a set of parameters uniquely associated with the selected transmission mode.

608 Transmit the DCI message to the UE.

(51) Int. Cl.

| | |
|---|---|
| ***H04L 25/03*** | (2006.01) |
| ***H04L 1/00*** | (2006.01) |
| *H04B 7/04* | (2006.01) |
| *H04L 1/18* | (2006.01) |
| *H04L 5/00* | (2006.01) |

(52) U.S. Cl.

CPC ............ *H04L1/1896* (2013.01); *H04L 5/0023* (2013.01); *H04L 5/0053* (2013.01); *H04L 5/0091* (2013.01); *H04L 25/03891* (2013.01)

(56) References Cited

U.S. PATENT DOCUMENTS

| | | | | |
|---|---|---|---|---|
| 2007/0054633 | A1* | 3/2007 | Piirainen | 455/115.3 |
| 2009/0305698 | A1 | 12/2009 | Zhang et al. | |
| 2010/0172430 | A1 | 7/2010 | Melzer et al. | |
| 2010/0177810 | A1* | 7/2010 | Luo et al. | 375/219 |
| 2011/0105162 | A1* | 5/2011 | Kim et al. | 455/500 |
| 2011/0261774 | A1 | 10/2011 | Lunttila et al. | |

FOREIGN PATENT DOCUMENTS

| | | | |
|---|---|---|---|
| WO | WO2009153810 | A2 | 12/2009 |
| WO | WO2010081159 | | 7/2010 |
| WO | WO2010088665 | A1 | 8/2010 |

OTHER PUBLICATIONS

Qualcomm Incorporated: "UL Transmission Modes for MIMO Transmissions", 3GPP DRAFT; R1-104805 UL Transmission Modes, 3rd Generation Partnership Project (3GPP), Mobile Competence Centre ; 650, Route Des Lucioles ; F-06921 Sophia-Antipolis Cedex ; France, vol. RAN WG1, No. Madrid, Spain; 20100823, Aug. 27, 2010, XP050450239, [retrieved on Aug. 27, 2010].

Nortel: "On the Need of Rank Adaptation for High Mobility UE", 3GPP R1-080382, Jan. 18, 2008.

Nortel: "The Need of Supporting Open-loop SM in Initial Deployment of Release-8", 3GPP R1-083263, Aug. 22, 2008.

Panasonic: "DCI format design for new transmission schemes", 3GPP R1-101250, Jan. 26, 2010.

Qualcomm Incorporated: "Details of DCI Format 4", 3GPP R1-106362, Nov. 19, 2010.

Qualcomm Incorporated: "UL grants for MIMO transmissions", 3GPP R1-104229, Jul. 2, 2010.

Qualcomm Incorporated: "UL grants for MIMO transmissions", 3GPP R1-104804, <URL:http://www.3gpp.org/ftp/tsg_ran/WG1_RL1/TSGR1_62/Docs/>, Aug. 17, 2010.

Qualcomm Incorporated: "UL transmission modes for MIMO transmissions", 3GPP DRAFT; R1-103548 UL Transmission Modes for MIMO Transmissions, 3rd Generation Partnership Project (3GPP), Mobile Competence Centre ; 650, Route Des Lucioles ; F-06921 Sophia-Antipolis Cedex ; France, vol. RAN WG1, No. Dresden, Germany; 20100628, Jun. 22, 2010, XP050449054, [retrieved on Jun. 22, 2010].

Qualcomm Incorporated: "UL Transmission Modes for MIMO Transmissions", 3GPP R1-105573, Oct. 15, 2010.

Partial International Search Report—PCT/US2011/048600—ISA/EPO—Dec. 6, 2011.

Qualcomm Inc, "Codebook system evaluation", 3GPP DRAFT, R1-103952 codebook system evaluation, 3rd Generation Partnership Project (3GPP), Mobile Competence Centre , 650, Route Des Lucioles , F-06921 Sophia-Antipolis Cedex , France, vol. RAN WG1, No. Dresden, Germany, 20100628, Jul. 5, 2010, XP050449557, [retrieved on Jul. 5, 2010].

* cited by examiner

300

SC-FDM

| Precoder | Precoder | Precoder | RS | Precoder | Precoder | Precoder | Precoder | Precoder | Precoder | RS | Precoder | Precoder | Precoder |
|---|---|---|---|---|---|---|---|---|---|---|---|---|---|
| 0 | 1 | 2 | 3 | 4 | 5 | 6 | 7 | 8 | 9 | 10 | 11 | 12 | 13 |

SC-FDM

| Precoder #0 | Precoder #1 | Precoder #2 | RS | Precoder #3 | Precoder #4 | Precoder #5 | Precoder #6 | Precoder #7 | Precoder #8 | RS | Precoder #9 | Precoder #10 | Precoder #11 |
|---|---|---|---|---|---|---|---|---|---|---|---|---|---|
| 0 | 1 | 2 | 3 | 4 | 5 | 6 | 7 | 8 | 9 | 10 | 11 | 12 | 13 |

FIG. 3B

OPEN LOOP MIMO MODE FOR LTE-A UPLINK

CROSS-REFERENCE TO RELATED APPLICATIONS

This application claims the benefit of U.S. Provisional Patent Application No. 61/376,639, entitled, "OPEN LOOP MIMO MODE FOR LTE-A UPLINK", filed on Aug. 24, 2010, which is expressly incorporated by reference herein in its entirety.

BACKGROUND

I. Field

The present disclosure relates generally to communication, and more specifically to techniques for allocating and using transmission resources in a multi-input multi-output (MIMO) wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of user equipments (UEs). A base station may include multiple transmit and/or receive antennas. Each UE may include multiple transmit and/or receive antennas. UEs may transport in the uplink using transport block assignments indicated by the base station. In conventional wireless systems, such as the currently agreed upon version of the Long Term Evolution (LTE), the transmission in the uplink direction may be performed either as a single input, multiple output (SIMO) or as a closed loop MIMO transmission. With the introduction of UEs with up to four antennas in the LTE Advanced (LTE-A) specification, additional uplink transmission schemes may improve performance.

SUMMARY

Representative aspects of the present disclosure are directed to a precoding scheme to accommodate UEs having a higher Doppler speed, which causes the channel seen by the UEs to change rapidly, even within one subframe of time, 1 ms, including a sequence of OFDM symbols. In such transmission schemes, a different precoding matrix is applied to each OFDM symbol in the transmission stream. In some example aspects, the precoding matrices may be selected from a known library of precoding matrices (e.g., a standard library), while in other example aspects, the UE may permute each precoding matrix selected from the known library to increase application of the same set of matrix layers.

In another representative aspect of the present disclosure, a downlink control message format is defined to handle assignment of multiple different transmission schemes using the same message format. Such downlink control messages include a control element in one of the message fields along with a set of parameters. Based on the value of this control element, the UE sets a specific transmission scheme and determes a set of interpretation rules uniquely associated with that transmission scheme. Using the interpretation rules, the UE is able to read the set of parameters as applied to the selected transmission scheme.

In one aspect of the disclosure, a method of precoding multiple OFDM symbols in an uplink transmission stream, including assigning a first precoding matrix to a first OFDM symbol and assigning a second precoding matrix to a second OFDM symbol, where the second precoding matrix is different from the first precoding matrix.

In an additional aspect of the disclosure, an apparatus configured for wireless communication includes means for assigning a first precoding matrix to a first OFDM symbol; and means for assigning a second precoding matrix to a second OFDM symbol, where the second precoding matrix is different from the first precoding matrix.

In an additional aspect of the disclosure, a computer program product has a computer-readable medium having program code recorded thereon. This program code includes code to assign a first precoding matrix to a first OFDM symbol and code to assign a second precoding matrix to a second OFDM symbol, where the second precoding matrix is different from the first precoding matrix.

In an additional aspect of the disclosure, an apparatus configured for wireless communication includes at least one processor and a memory coupled to the processor and is configured to assign a first precoding matrix to a first OFDM symbol and assign a second precoding matrix to a second OFDM symbol, where the second precoding matrix is different from the first precoding matrix.

In another aspect of the disclosure, a method for wireless communication includes identifying a selected transmission scheme from multiple transmission schemes suitable for UE communication, selecting a control element associated with the selected transmission scheme, generating a DCI message using the control element and a set of parameters uniquely associated with the selected transmission scheme, and transmitting the DCI message to the UE.

In an additional aspect of the disclosure, an apparatus configured for wireless communication includes means for identifying a selected transmission scheme from multiple transmission schemes suitable for UE communication, means for selecting a control element associated with the selected transmission scheme, means for generating a DCI message using the control element and a set of parameters uniquely associated with the selected transmission scheme, and means for transmitting the DCI message to the UE.

In an additional aspect of the disclosure, a computer program product has a computer-readable medium having program code recorded thereon. This program code includes code to identify a selected transmission scheme from multiple transmission schemes suitable for UE communication, code to select a control element associated with the selected transmission scheme, code to generate a DCI message using the control element and a set of parameters uniquely associated with the selected transmission scheme, and code to transmit the DCI message to the UE.

In an additional aspect of the disclosure, an apparatus configured for wireless communication includes at least one processor and a memory coupled to the processor and is configured to identify a selected transmission scheme from multiple transmission schemes suitable for UE communication, to select a control element associated with the selected transmission scheme, to generate a DCI message using the control element and a set of parameters uniquely associated with the selected transmission scheme, and to transmit the DCI message to the UE.

In another aspect of the disclosure, a method for wireless communication includes receiving a downlink control message from a base station, reading a control element from the downlink control message, setting an uplink transmission scheme based on the control element, determining a set of interpretation rules uniquely associated with the control element, and interpreting a set of parameters within the downlink control message according to the set of interpretation rules.

In an additional aspect of the disclosure, an apparatus configured for wireless communication includes means for receiving a downlink control message from a base station, means for reading a control element from the downlink control message, means for setting an uplink transmission scheme based on the control element, means for determining a set of interpretation rules uniquely associated with the control element, and means for interpreting a set of parameters within the downlink control message according to the set of interpretation rules.

In an additional aspect of the disclosure, a computer program product has a computer-readable medium having program code recorded thereon. This program code includes code to receive a downlink control message from a base station, code to read a control element from the downlink control message, code to set an uplink transmission scheme based on the control element, code to determine a set of interpretation rules uniquely associated with the control element, and code to interpret a set of parameters within the downlink control message according to the set of interpretation rules.

In an additional aspect of the disclosure, an apparatus configured for wireless communication includes at least one processor and a memory coupled to the processor and is configured to receive a downlink control message from a base station, to read a control element from the downlink control message, to set an uplink transmission scheme based on the control element, to determine a set of interpretation rules uniquely associated with the control element, and to interpret a set of parameters within the downlink control message according to the set of interpretation rules.

Various aspects and features of the disclosure are described in further detail below.

BRIEF DESCRIPTION OF THE DRAWINGS

FIG. 3A is a block diagram illustrating an example of a conceptual transmission sequence of OFDM symbols.

FIG. 3B is a block diagram illustrating a conceptual transmission sequence of OFDM symbols configured according to one aspect of the present disclosure.

DETAILED DESCRIPTION

As previously discussed, the introduction of additional antenna configurations of a UE may require signaling on the downlink to support additional SIMO or MIMO modes of transmission. In conventional LTE systems, downlink control information (DCI) messages signal one of two modes: SIMO or MIMO closed loop. To achieve improved performance, for example, when UEs are experiencing high Doppler fading (e.g., a fast moving UE), new MIMO modes are desirable.

As discussed in details below, a new syntactical element for signaling DCI message is introduced. The fields of the new DCI message are provided to enable signaling of either a closed loop rank 1 MIMO mode or an open loop MIMO mode using different values of a field of the DCI message. Furthermore, in one aspect, a field is provided in the new DCI message. The interpretation of this field is context-sensitive depending upon a rank value indicated in another field of the new DCI message. The signaling of rank 1 scheme, as discussed in details below, may be useful in situations when a UE is at the edge of a cell, or when a channel between a UE and a base station is highly correlated. Open loop MIMO signaling, as discussed in details below, may be useful for fast moving UEs or for UEs in high geometry cases.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE, and LTE terminology is used in much of the description below.

Figure 1:
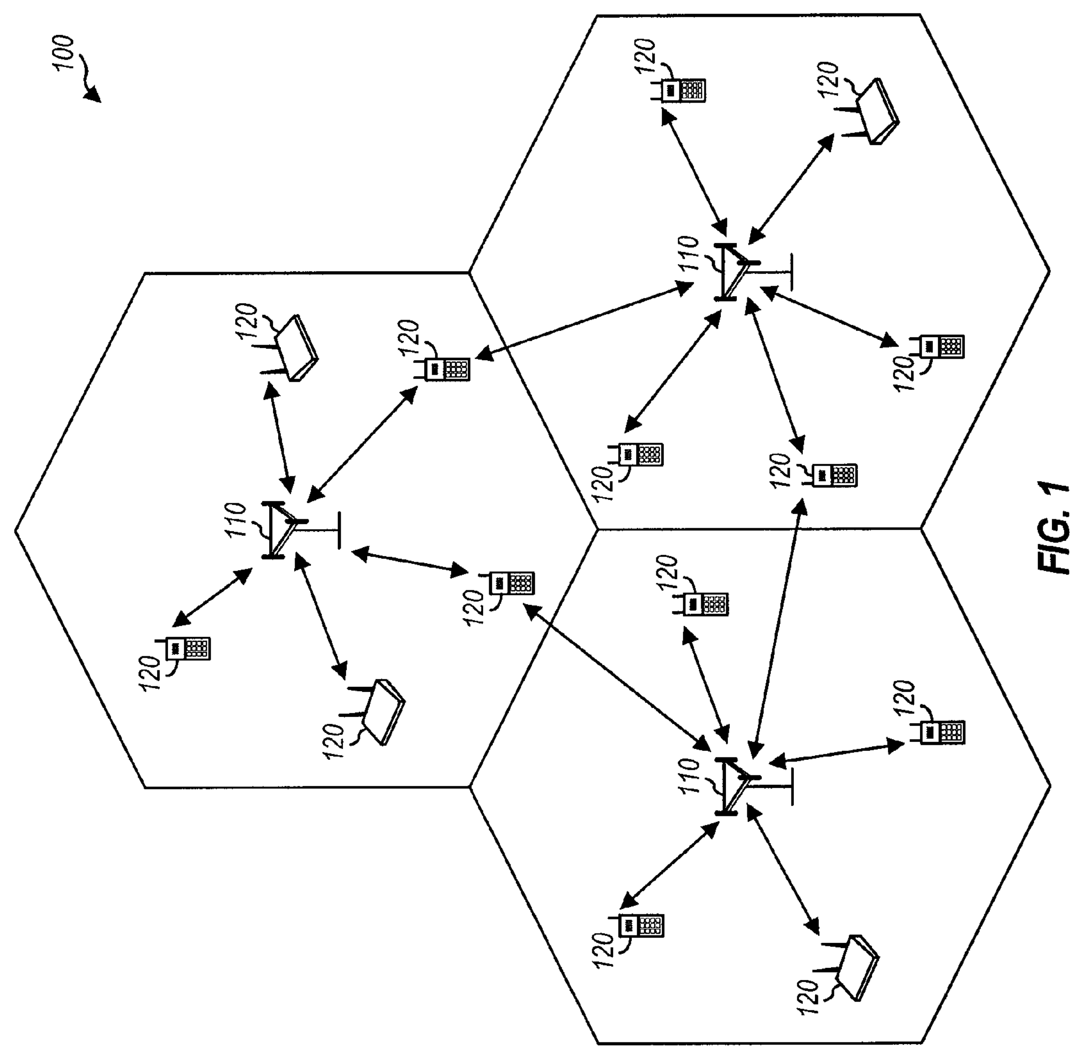
FIG. 1 is a block diagram conceptually illustrating an example of a mobile communication system.

FIG. 1 shows a wireless communication system 100, which may be an LTE system or some other system. System 100 may include a number of evolved Node Bs (eNBs) 110 and other network entities. An eNB may be an entity that communicates with the UEs and may also be referred to as a base station, a Node B, an access point, etc. Each eNB 110 may provide communication coverage for a particular geographic area and may support communication for the UEs located within the coverage area. To improve capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB 110 and/or an eNB subsystem serving this coverage area.

UEs 120 may be dispersed throughout the system 100, and each UE 120 may be stationary or mobile. A UE may also be referred to as a mobile station, a terminal, an access terminal, a subscriber unit, a station, etc. A UE 120 may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc.

LTE utilizes orthogonal frequency division multiplexing (OFDM) on the downlink and single-carrier frequency division multiplexing (SC-FDM) on the uplink. OFDM and SC-FDM partition a frequency range into multiple ($K_s$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($K_s$) may be dependent on the system bandwidth. For example, $K_s$ may be equal to 128, 256, 512, 1024 or 2048 for system bandwidth of 1.25, 2.5, 5, 10 or 20 mega-Hertz (MHz), respectively. The system bandwidth may correspond to a subset of the $K_s$ total subcarriers.

Figure 2:
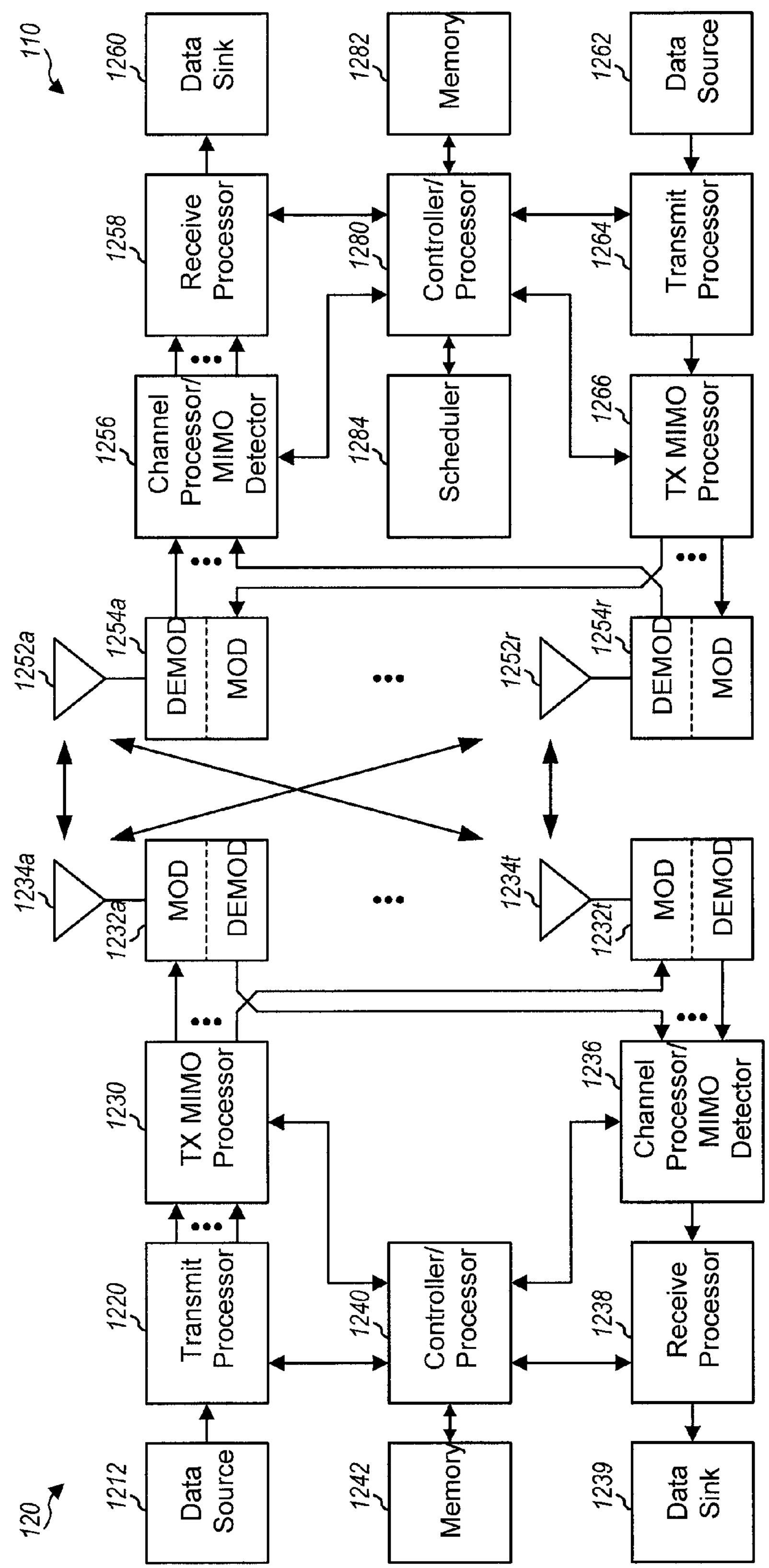
FIG. 2 is a block diagram conceptually illustrating a design of a base station/eNB and a UE configured according to one aspect of the present disclosure.

FIG. 2 shows a block diagram of a design of an exemplary base station/eNB 110 and a UE 120, which may be one of the eNBs and one of the UEs in FIG. 1. A UE 120 may be equipped with T antennas 1234*a* through 1234*t*, and base station 110 may be equipped with R antennas 1252*a* through 1252*r*, where in general T≥1 and R≥1.

At UE 120, a transmit processor 1220 may receive data from a data source 1212 and control information from a controller/processor 1240. Transmit processor 1220 may process (e.g., encode, interleave, and symbol map) the data and control information and may provide data symbols and control symbols, respectively. Transmit processor 1220 may also generate one or more demodulation reference signals for multiple non-contiguous clusters based on one or more RS sequences assigned to UE 120 and may provide reference symbols. A transmit (TX) multiple-input multiple-output (MIMO) processor 1230 may perform spatial processing (e.g., precoding) on the data symbols, the control symbols, and/or the reference symbols from transmit processor 1220, if applicable, and may provide T output symbol streams to T modulators (MODs) 1232*a* through 1232*t*. Each modulator 1232 may process a respective output symbol stream (e.g., for SC-FDMA, OFDM, etc.) to obtain an output sample stream. Each modulator 1232 may further process (e.g., convert to analog, amplify, filter, and upconvert) the output sample stream to obtain an uplink signal. T uplink signals from modulators 1232*a* through 1232*t* may be transmitted via T antennas 1234*a* through 1234*t*, respectively.

At base station 110, antennas 1252*a* through 1252*r* may receive the uplink signals from UE 120 and provide received signals to demodulators (DEMODs) 1254*a* through 1254*r*, respectively. Each demodulator 1254 may condition (e.g., filter, amplify, downconvert, and digitize) a respective received signal to obtain received samples. Each demodulator 1254 may further process the received samples to obtain received symbols. A channel processor/MIMO detector 1256 may obtain received symbols from all R demodulators 1254*a* through 1254*r*. Channel processor 1256 may derive a channel estimate for a wireless channel from UE 120 to base station 110 based on the demodulation reference signals received from UE 120. MIMO detector 1256 may perform MIMO detection/demodulation on the received symbols based on the channel estimate and may provide detected symbols. A receive processor 1258 may process (e.g., symbol demap, deinterleave, and decode) the detected symbols, provide decoded data to a data sink 1260, and provide decoded control information to a controller/processor 1280.

On the downlink, at base station 110, data from a data source 1262 and control information from controller/processor 1280 may be processed by a transmit processor 1264, precoded by a TX MIMO processor 1266 if applicable, conditioned by modulators 1254*a* through 1254*r*, and transmitted to UE 120. At UE 120, the downlink signals from base station 110 may be received by antennas 1234, conditioned by demodulators 1232, processed by a channel estimator/MIMO detector 1236, and further processed by a receive processor 1238 to obtain the data and control information sent to UE 120. Processor 1238 may provide the decoded data to a data sink 1239 and the decoded control information to controller/processor 1240.

Controllers/processors 1240 and 1280 may direct the operation at UE 120 and base station 110, respectively. Processor 1220, processor 1240, and/or other processors and modules at UE 120 may perform or direct process 800 in FIG. 8 and/or other processes for the techniques described herein. Processor 1256, processor 1280, and/or other processors and modules at base station 110 may perform or direct process 600 in FIG. 6 and/or other processes for the techniques described herein. Memories 1242 and 1282 may store data and program codes for UE 120 and base station 110, respectively. A scheduler 1284 may schedule UEs for downlink and/or uplink transmission and may provide allocations of resources (e.g., assignment of multiple non-contiguous clusters, RS sequences for demodulation reference signals, etc.) for the scheduled UEs.

Certain uplink transmissions schemes are available to the UE 120 for transmission to an eNodeB 110. The precoding matrix (or vector) may be switched per OFDM symbol. The precoding matrices used in each OFDM symbol are derived from the agreed codebook in the 3GPP TS 36.211 document.

FIG. 3A is a block diagram illustrating a portion 300 of an uplink signal transmitted by the UE 120. In LTE-A, the upstream transmission uses single carrier frequency domain multiplexing (SC-FDM). The signal portion 300 depicts 12 OFDM data symbol transmissions with two reference signal (RS) transmissions interspersed within the 14 symbols of the two illustrated slots. Currently, the same precoding matrix (or vector) is used for each OFDM symbol (e.g., 300-0-300-2, 300-4-300-9, 300-11-300-13) of the transmission stream. The precoding matrices used for the OFDM symbols are currently derived from a codebook in the 3GPP TS 36.211 document. Using the same precoding matrix may be more beneficial when reliable channel knowledge is available. With a high Doppler (e.g., the UE is moving quickly) the channels change more quickly, therefore, the channel knowledge becomes less reliable.

Instead of keeping the same precoding matrix with each OFDM symbol, various aspects of the present disclosure provide for switching the precoding matrix (or vector) for each OFDM symbol. With reference to FIG. 3B, another portion 301 of a signal transmitted by the UE 120 is shown. Each OFDM symbol (e.g., 301-0-301-2, 301-4-301-9, 301-11-301-13) uses a different precoding matrix (precoders 0-11). The precoder used in each OFDM symbol (e.g., 301-0-301-2, 301-4-301-9, 301-11-301-13) in FIG. 3B may each be selected from the precoding matrices defined in the 3GPP TS 36.211 document.

Figure 3C:
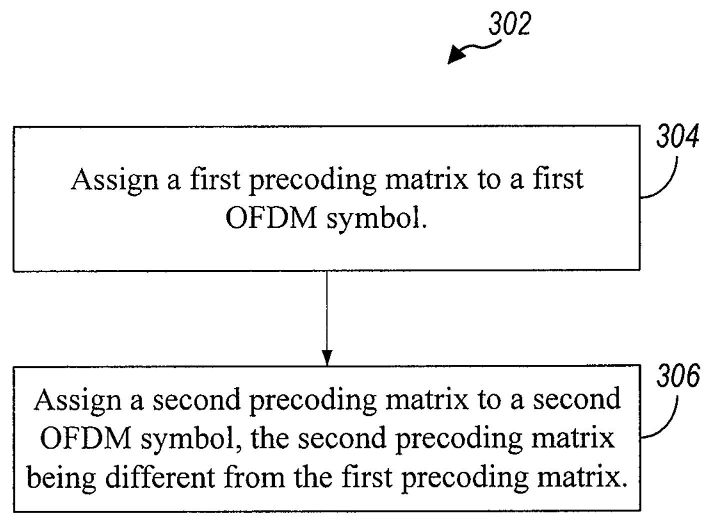
FIG. 3C is a functional block diagram illustrating example blocks executed to implement one aspect of the present disclosure.

FIG. 3C is a functional block diagram illustrating a block sequence 302 of example blocks executed to communicate a transmission scheme in a wireless communication system. In block 304, a first precoding matrix is assigned to a first OFDM symbol. A second precoding matrix is assigned to a second OFDM symbol, in block 306, the second precoding matrix being different from the first precoding matrix.

Figure 3D:
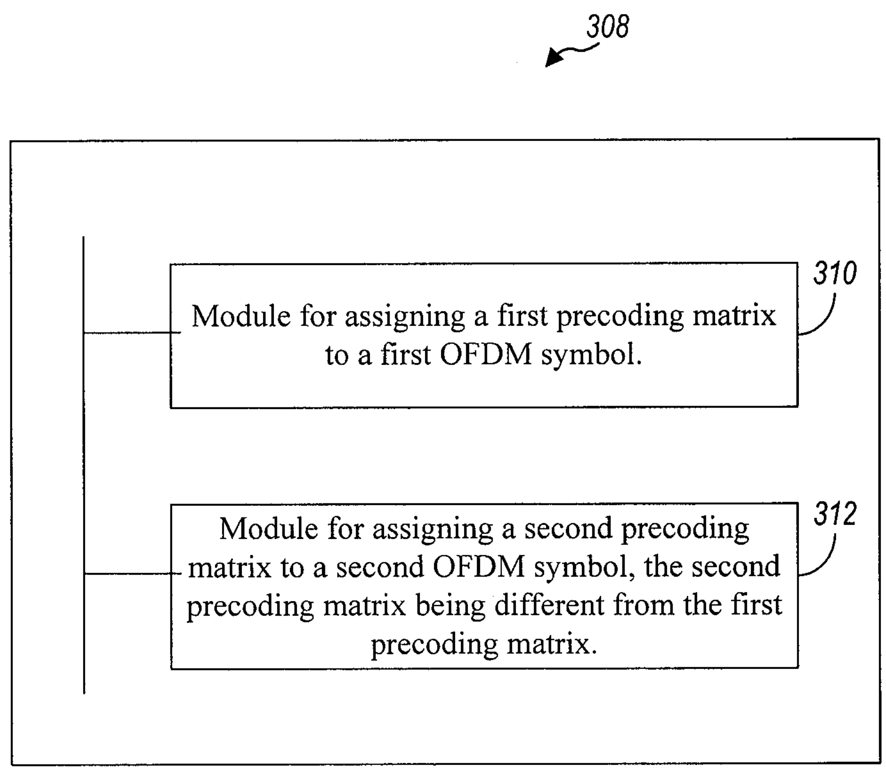
FIG. 3D. is a block diagram illustrating a conceptual wireless communication apparatus configured according to one aspect of the present disclosure.

FIG. 3D depicts an apparatus 308 for wireless communication (e.g., a UE 120) comprising a module 310 for assigning a first precoding matrix to a first OFDM symbol. A module 312 is provided to assign a second precoding matrix to a second OFDM symbol, the second precoding matrix being different from the first precoding matrix.

It should be noted that, in alternative aspects of the present disclosure, the different precoder used in each OFDM symbol in FIG. 3B may be derived by permuting the columns of the precoding matrices. In either aspect, whether the different precoding matrix is selected directly from the library of precoding matrices or the selected precoding matrix is permuted, the eNB 110 and the UE 120 should both know the sequence of precoding matrices utilized in each OFDM symbol. For example, the UE 120 may use a pseudo random sequence that the eNB 110 also knows.

Figure 4:
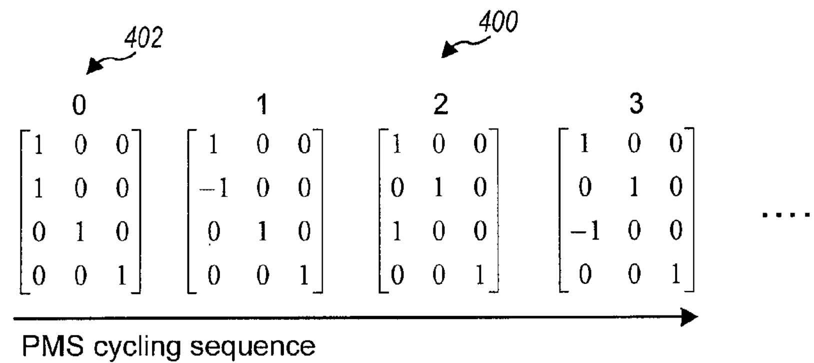
FIG. 4 is a block diagram illustrating a conceptual sequence of precoder matrices used in a MIMO system according to one aspect of the present disclosure.
Figure 5:
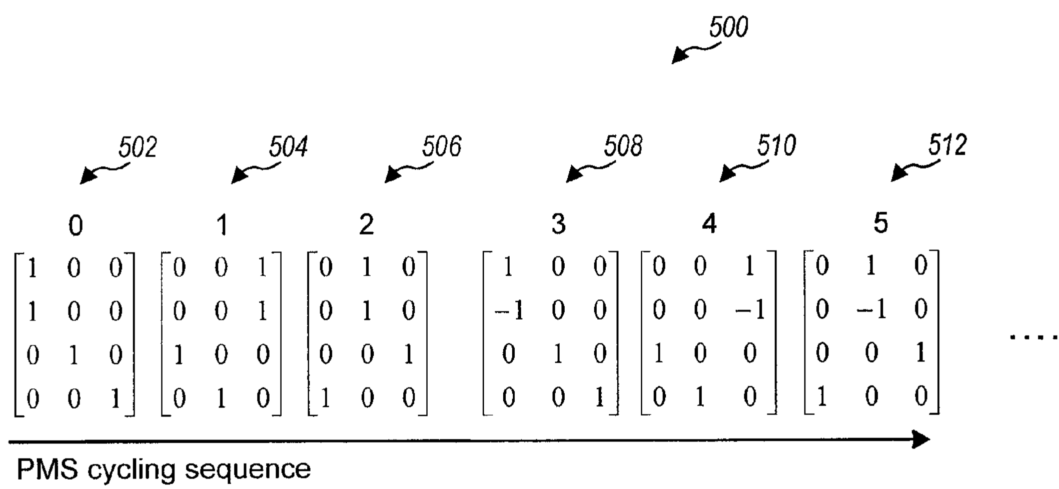
FIG. 5 is a block diagram illustrating another conceptual sequence of precoder matrices used in a MIMO system according to one aspect of the present disclosure.

FIG. 4 and FIG. 5 show example precoder assignments in precoder matrix cycling sequences 400 and 500. For example, assume that R is the transmission rank and M is the codebook size. In one design, e.g., as depicted in FIG. 4, a $k^{th}$ precoder (element 402) may simply be the $(k \bmod M)^{th}$ precoding matrix for rank R in the 3GPP TS 36.211 document. Precoder element 402 is used in OFDM symbol 301-0 (FIG. 3B). In another design, e.g., as depicted in FIG. 5, $(k \cdot R)^{th}$ precoder (element 502) could be the $(k \bmod M)^{th}$ precoding matrix in the 3GPP TS 36.211 document. The other precoders, $(k \cdot R+1, k \cdot R+2, \ldots, k \cdot R+R-1)^{th}$ precoders (elements 504, 506, 508, 510, and 512) may be column permuted version of the $(k \bmod M)^{th}$ precoding matrix.

Precoder element 504 is the precoder matrix of precoder element 502 after a single permutation. The third column of precoder element 504 is the first column of precoder element 502. The first permutation results further in the second column of precoder element 502 now being the first column of precoder element 504 and the second column of precoder element 504 being the third column of the precoder element 502. The transmission rank R of FIG. 4 and FIG. 5 is 3, thus each precoder matrix comprises three columns and may be permuted three times to achieve a different precoder matrix within a single transmission stream. Precoder elements 502, 504, and 506 are used in OFDM symbols 301-0, 301-1, and 301-2 (FIG. 3B). Precoder element 508 is a new precoding matrix selected from the known library and is permuted three times for precoder elements 510 and 512. The precoder elements 508, 510, and 512 are used in OFDM symbols 301-4, 301-5, and 301-6 (FIG. 3B).

The alternative aspect of the disclosure that uses permutations of the selected precoder matrices provides a middle option, between the standard of using the same precoder matrix for each OFDM symbol and the additional alternative aspect of the disclosure that selects a new precoding matrix directly from the known library of precoding matrices. By permuting the columns of a particular precoding matrix and applying to different OFDM symbols, even though different spatial layers see different channel conditions in on OFDM symbol, it is expected that the channel conditions for each spatial layer averaged over those OFDM symbols will be similar, which will render similar termination statistics for all code words.

In another design a new DCI syntactical message may be introduced for UL MIMO transmission. Currently, two transmission schemes are defined in uplink transmissions: (1) single antenna, single-input, multiple-output (SIMO); and (2) multiple antenna, multiple-input, multiple-output (MIMO). However, it would be beneficial in multi-antenna uplink transmissions to have additional transmission schemes. For example, lower geometry UEs may benefit from rank-1 closed-loop beamforming, while higher geometry UEs with a high Doppler will benefit from open-loop beam-forming or spatial multiplexing. Thus, in addition to the current standard transmission schemes, it would be beneficial to define additional open-loop transmission schemes, such as rank-1 open-loop beamforming and higher-rank open-loop spatial multiplexing. However, under the current standards, DCI messages cannot handle more than the existing two transmission schemes.

As explained further below, a new DCI message is defined that allows scheduling of either rank-1 closed-loop beamforming or higher rank open-loop spatial multiplexing using a single DCI message transmission. This new DCI message format includes a control entry that, depending on the value of the control entry, the various fields of the DCI message may be interpreted according to a different set of rules.

Table 1 provides an example format of the new DCI message. In other designs, the various fields may be arranged differently.

TABLE 1

DCI format for 2 Transmit Antennas

| Field | Bit Width | Notes |
|---|---|---|
| MCS | 5 | modulation and coding scheme |
| NDI_1 | 1 | first new data indicator |
| RI | 1 | rank indicator |
| NDI_2 | 1 | second new data indicator |
| PMI | 5 | precoding matrix index |
| others | X | resource block assignment, power control, etc |
| total payload | X + 13 | |

With reference to Table 1, the MCS field represents an index to a modulation and coding scheme. NDL_1 and NDI_2 are two new data indicator bits and are used as further described below. Since a configuration with 2 transmit antennas may have rank 1 or 2, a single bit RI is used to convey the rank information. PMI represents a precoding matrix index (e.g., an index to the sequence as depicted in FIG. 3 or FIG. 4), as further explained below. Other data fields of varying lengths, collectively represented as X, may be included, as is well known in the art. For the aspect of the DCI message referenced in Table 1, the control entry is the rank indicator (RI). Depending on the value of RI, the different fields of the DCI message will be interpreted differently.

For example, when RI is set to 0 by the eNodeB 110, a single transport block (TB) is to be transmitted because the communication channel has rank 1. The UE 120, therefore, performs rank-1 beamforming for a single TB transmission. NDU denotes whether the TB to be transmitted is a new transmission or a re-transmission. With RI=0, NDI_2 denotes the index of the enabled TB (the TB being transmitted, in case of a re-transmission). NDI_2 bit may not be useful for a new transmission, but in the case of a re-transmission, NDL_2 indicates which block is to be retransmitted. With the 5-bit PMI field, 32 different code points (indices) are possible. In one design, 6 codepoints may be used for signaling a precoding vector for rank-1 closed-loop beamforming. One of the remaining 26 codepoints may be utilized to signal that the transmission is to be an open-loop rank-1 transmission. This signaling may be used, for example, when performing a rank-1 precoding vector switching over OFDM symbols. The unused code points may be reserved for future use.

When RI is set to 1, the UE 120 may perform open-loop MIMO with a different precoding matrix sequence (PMS) per OFDM symbol (e.g., as shown in FIGS. 3 and 4). When two TBs are to be transmitted with transmission rank 2, NDI_1 may denote whether TB_1 is a new transmission or a re-transmission. With RI=1, NDI_2 may denote whether TB_2 is a new transmission or a re-transmission. The 5-bit MCS field may signal the MCS for the first TB and, in the RI=1 case, the 5-bit PMI field may be interpreted by the UE 120 to represent the MCS for the second TB.

Table 2 provides an example DCI message format when a UE 120 has four transmit antennas. The various fields listed in Table 2 may be used in any predefined order.

TABLE 2

DCI format for 4 Transmit Antennas

| Field | Bit Width | Notes |
|---|---|---|
| MCS | 5 | modulation and coding scheme |
| NDI_1 | 1 | first new data indicator |
| RI | 2 | rank indicator |
| NDI_2 | 1 | second new data indicator |
| PMI | 5 | precoding matrix index |
| others | X | resource block assignment, power control, etc |
| total payload | X + 14 | |

Here again, RI is the control entry of this aspect of the DCI message. When the eNodeB 110 sets RI to 0, it is an indication to the UE 120 to perform rank-1 beamforming (because a single TB is to be transmitted). When a single TB is to be transmitted, NDI_1 denotes whether this is a new transmission or a re-transmission and NDI_2 dictates index of the enabled TB, similar to previously described with respect to Table 1. Of the 32 codepoints possible with the 5-bit PMI field, 24 codepoints may be used for signaling the precoding vector for rank-1 closed-loop beamforming. One of the remaining codepoints may be utilized for signaling of rank-1 open-loop transmission. Another one of the remaining seven codepoints may be utilized for signaling rank-2 open-loop MIMO operation. For example, this value of codepoint may be used to handle the scenario where a TB mapped onto 2 layers is re-transmitted.

When RI is set to 1, 2, or 3, this is an indication to the UE 120 to do open-loop MIMO by applying a different precoding matrix per OFDM symbol. In a four-antenna configuration, the UE 120 may perform an initial rank 3/4 transmission by mapping a single TB to two layers. NDL_1 may denote whether TB_1 is a new transmission or a re-transmission, and NDI_2 may denote whether TB_2 is a new transmission or a re-transmission. The 5-bit MCS field may signal the MCS for the first TB, and, in the RI=1, 2, or 3 cases, the 5-bit PMI field may be used to signal the MCS for the second TB.

Figure 6:
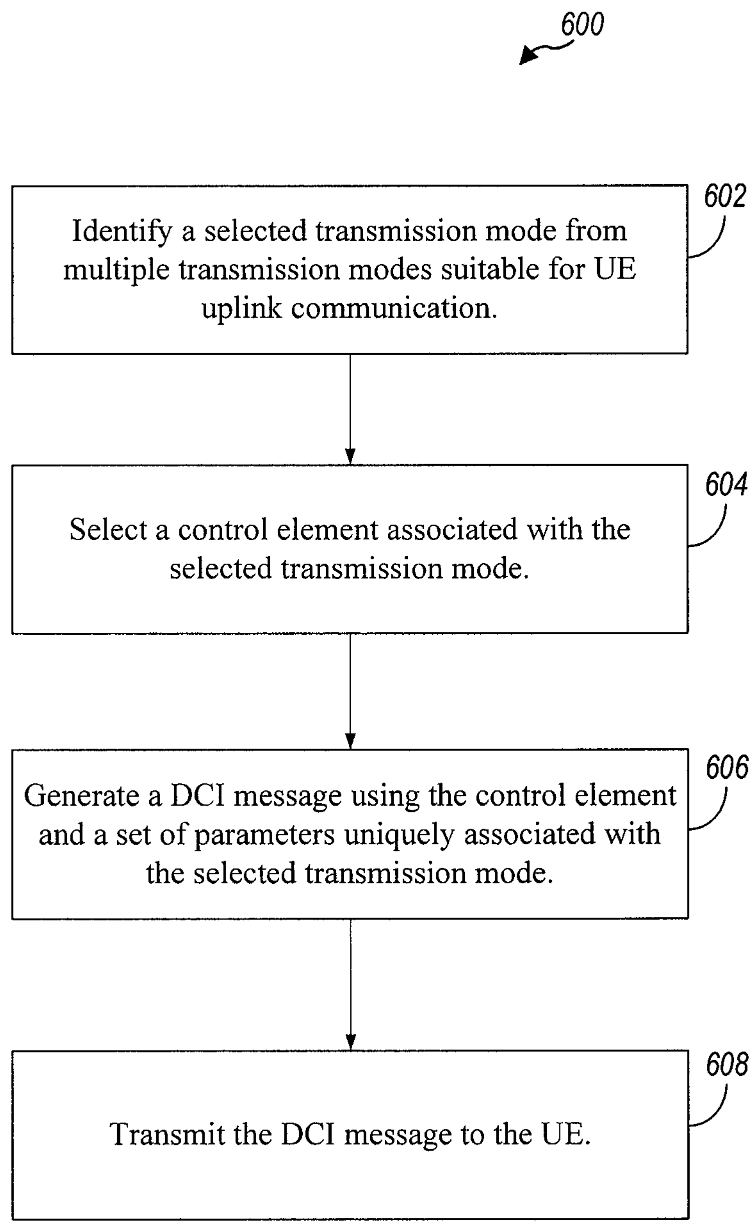
FIG. 6 is a functional block diagram illustrating example blocks executed to implement one aspect of the present disclosure.

FIG. 6 is a functional block diagram illustrating a block sequence 600 of example blocks executed to communicate a transmission scheme in a wireless communication system. In block 602, a selected transmission scheme is identified from multiple transmission schemes suitable for UE uplink communication. A control element associated with the selected transmission scheme is selected in block 604. A DCI message is generated, in block 606, using the control element and a set of parameters uniquely associated with the selected transmission scheme. The DCI message is then transmitted, in block 608, to the UE.

Figure 7:
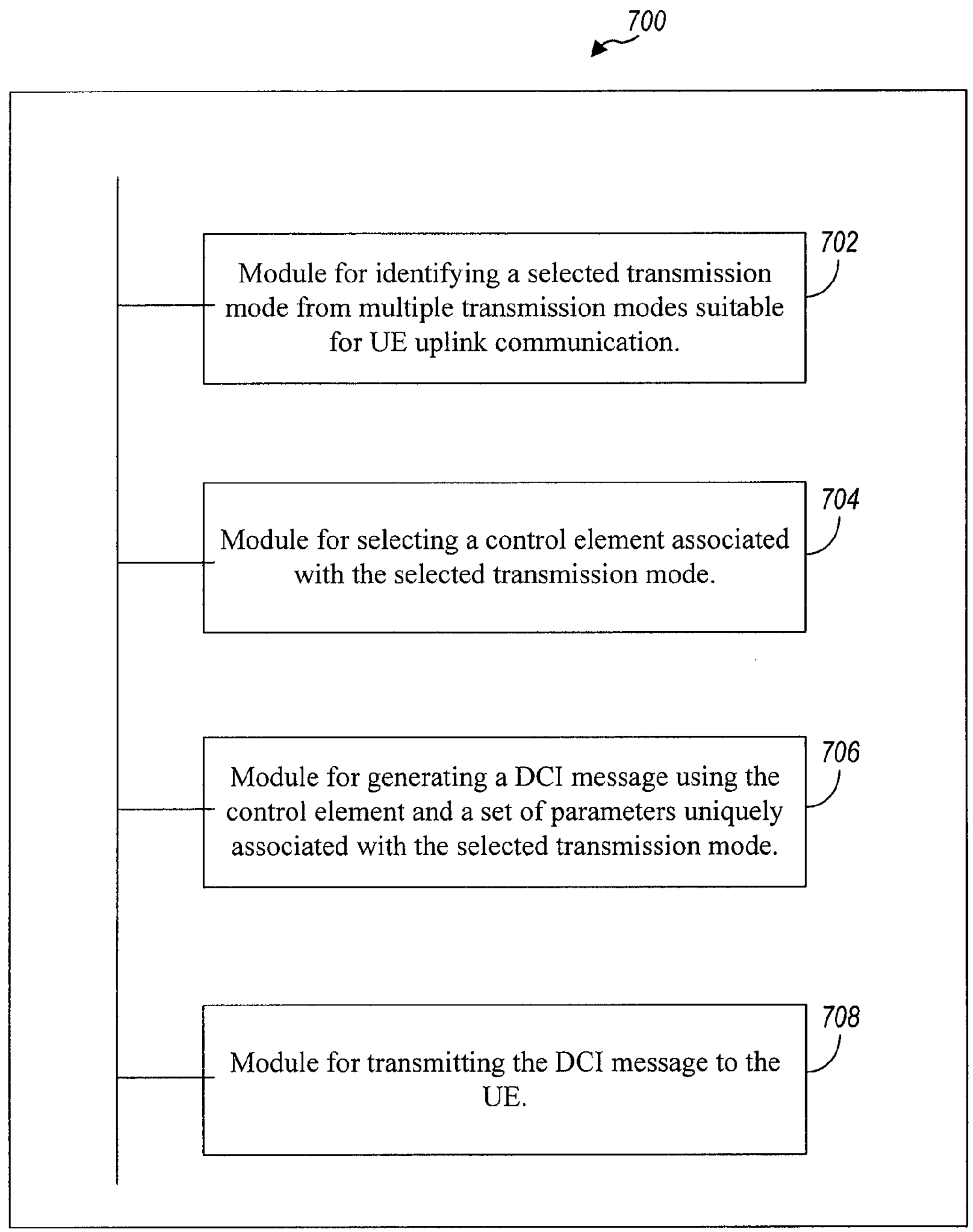
FIG. 7 is a block diagram representation of a wireless communication transmitter apparatus configured according to one aspect of the present disclosure.

FIG. 7 depicts an apparatus 700 for wireless communication (e.g., a UE 120) comprising a module 702 for identifying a selected transmission scheme from multiple transmission schemes suitable for UE communication. Module 704 is provided to select a control element associated with the selected transmission scheme. Module 706 is for generating a DCI message using the control element and a set of parameters uniquely associated with the selected transmission scheme. The module 708 is provided to transmit the DCI message to the UE.

Figure 8:
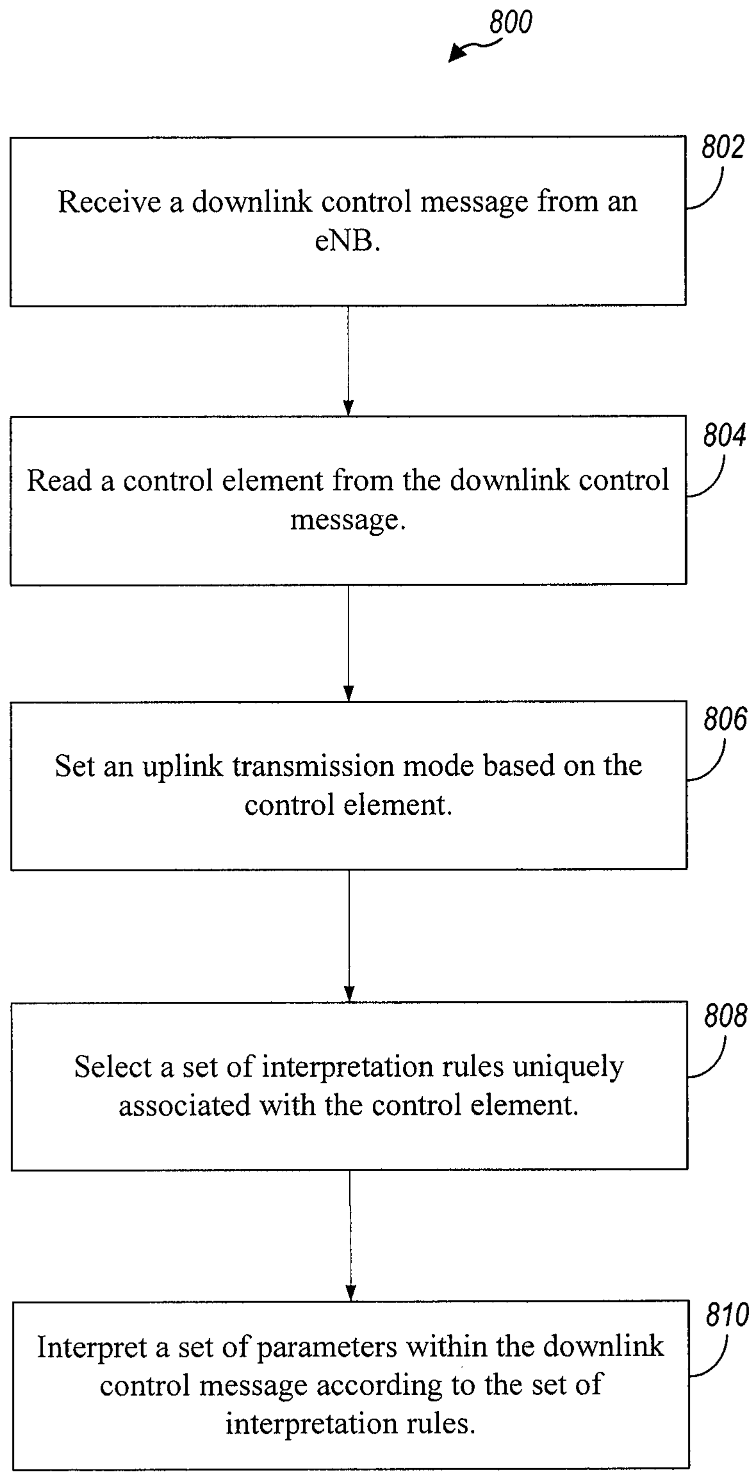
FIG. 8 functional block diagram illustrating example blocks executed to implement one aspect of the present disclosure.

FIG. 8 is a functional block diagram illustrating a block sequence 800 of example blocks executed to communicate a transmission scheme in a wireless communication system. In block 802, a downlink control message is received from a base station. A control element is read, in block 804, from the downlink control message. In block 806, an uplink transmission scheme is set based on the control element. A set of interpretation rules uniquely associated with the control element is determined in block 808. A set of parameters within the downlink control message are then interpreted, in block 810, according to the set of interpretation rules.

Figure 9:
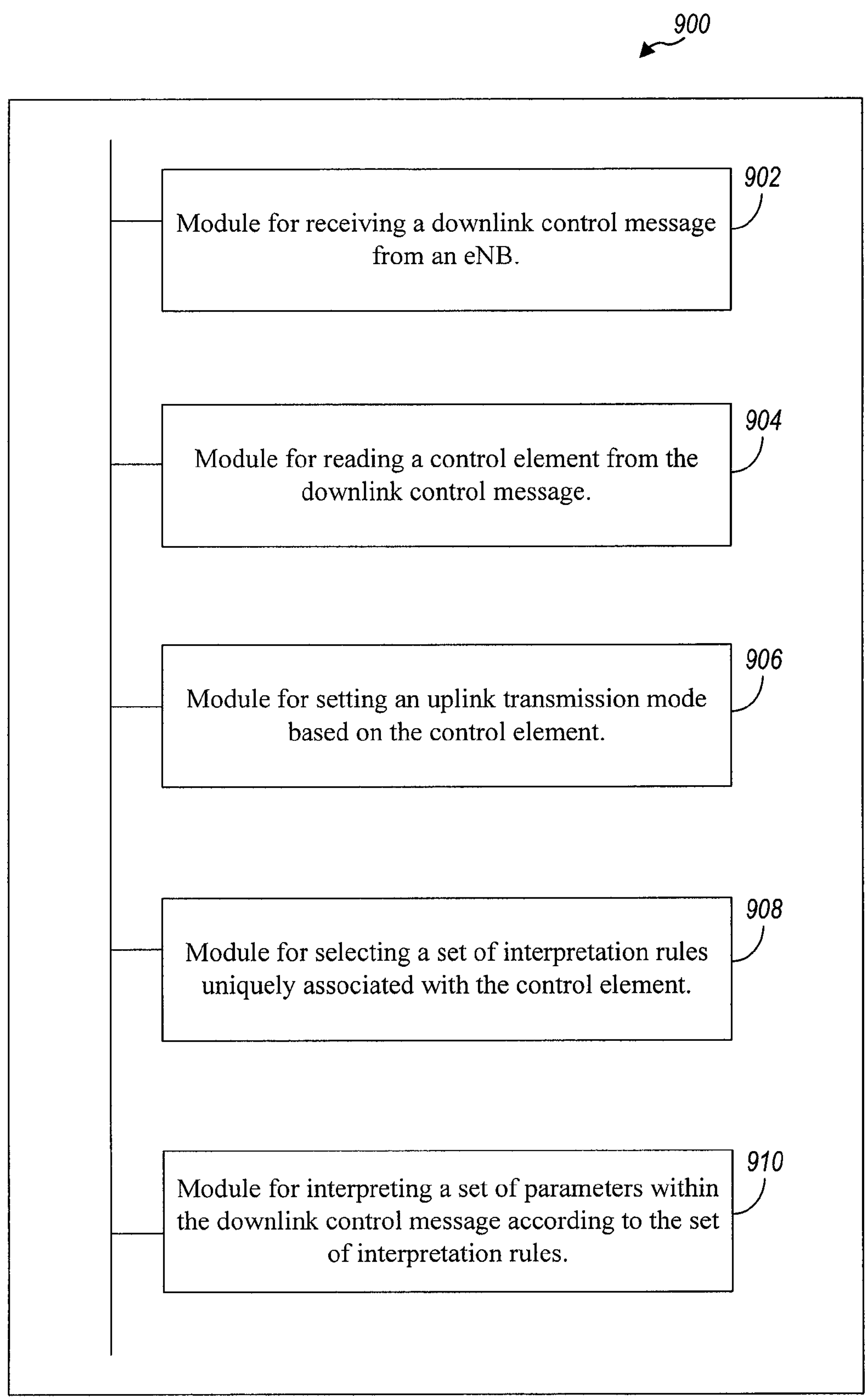
FIG. 9 is a block diagram representation of a wireless communication receiver apparatus configured according to one aspect of the present disclosure.

FIG. 9 is a depiction of a wireless communication receiver apparatus 900. Module 902 is provided for receiving a downlink control message from a base station. Module 904 is for reading a control element from the downlink control message. Module 906 is provided to set an uplink transmission scheme based on the control element. A module 908 is for determining a set of interpretation rules uniquely associated with the control element. Module 910 is provided for interpreting a set of parameters within the downlink control message according to the set of interpretation rules.

As will be appreciated, the new DCI messaging procedure described herein enables signaling of either rank 1 closed loop beamforming, open-loop beamforming, or a higher rank (e.g., 2, 3, or 4) open loop spatial multiplexing using the same syntax (e.g., single DCI format). A control element in a field of the new DCI message indicates to a UE 120 the transmission scheme and the particular set of rules to use in interpreting the set of parameters associated with the selected transmission scheme found in the DCI message. New fields are also added in order to accommodate the potential transport of multiple transport blocks.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a non-transitory computer-readable medium. Non-transitory computer-readable media includes computer storage media and the like. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:

identifying a selected transmission scheme from a plurality of transmission schemes suitable for user equipment (UE) communication;

selecting a control element associated with the selected transmission scheme, wherein the control element indicates to a UE at least the selected transmission scheme and a set of rules for interpreting a set of parameters associated with the selected transmission scheme, wherein the set of rules is dependent on the selected control element;

generating a downlink control information (DCI) message using the control element and the set of parameters; and transmitting the DCI message to the UE.

2. The method of claim 1, wherein the control element is a rank indicator.

3. The method of claim 1, wherein the selected transmission scheme is one of: a closed-loop beamforming transmission, an open-loop beamforming transmission, and an open-loop spatial multiplexing transmission.

4. An apparatus for wireless communication, comprising:

means for identifying a selected transmission scheme from a plurality of transmission schemes suitable for user equipment (UE) communication;

means for selecting a control element associated with the selected transmission scheme, wherein the control element indicates to a UE at least the selected transmission scheme and a set of rules for interpreting a set of parameters associated with the selected transmission scheme, wherein the set of rules is dependent on the selected control element;

means for generating a downlink control information (DCI) message using the control element and the set of parameters; and means for transmitting the DCI message to the UE.

5. The apparatus of claim 4, wherein the control element is a rank indicator.

6. The apparatus of claim 4, wherein the selected transmission scheme is one of: a closed-loop beamforming transmission, an open-loop beamforming transmission, and an open-loop spatial multiplexing transmission.

7. A non-transitory computer-readable medium having program code recorded thereon, comprising:

program code for causing a computer to identify a selected transmission scheme from a plurality of transmission schemes suitable for user equipment (UE) communication;

program code for causing the computer to select a control element associated with the selected transmission scheme, wherein the control element indicates to a UE at least the selected transmission scheme and a set of rules for interpreting a set of parameters associated with the selected transmission scheme, wherein the set of rules is dependent on the selected control element;

program code for causing the computer to generate a downlink control information (DCI) message using the control element and the set of parameters; and program code for causing the computer to transmit the DCI message to the UE.

8. The non-transitory computer-readable medium of claim 7, wherein the control element is a rank indicator.

9. The non-transitory computer-readable medium of claim 7, wherein the selected transmission scheme is one of: a closed-loop beamforming transmission, an open-loop beamforming transmission, and an open-loop spatial multiplexing transmission.

10. An apparatus configured for wireless communication, the apparatus comprising:

at least one processor; and a memory coupled to the at least one processor, wherein the at least one processor is configured to:

identify a selected transmission scheme from a plurality of transmission schemes suitable for user equipment (UE) communication;

select a control element associated with the selected transmission scheme, wherein the control element indicates to a UE at least the selected transmission scheme and a set of rules for interpreting a set of parameters associated with the selected transmission scheme, wherein the set of rules is dependent on the selected control element;

generate a downlink control information (DCI) message using the control element and the set of parameters; and transmit the DCI message to the UE.

11. The apparatus of claim 10, wherein the control element is a rank indicator.

12. The apparatus of claim 10, wherein the selected transmission scheme is one of: a closed-loop beamforming transmission, an open-loop beamforming transmission, and an open-loop spatial multiplexing transmission.

13. A method for uplink communication in a wireless network, comprising:

receiving a downlink control message from a base station;

reading a control element from the downlink control message, wherein the control element indicates at least a transmission scheme and a set of interpretation rules for interpreting a set of parameters associated with the selected transmission scheme;

setting an uplink transmission scheme based on the transmission scheme indicated by the control element;

determining the set of interpretation rules indicated by the control element, wherein the set of interpretation rules is dependent on the control element; and interpreting the set of parameters within the downlink control message according to the set of interpretation rules.

14. The method of claim 13, wherein the control element is a rank indicator.

15. The method of claim 13, wherein the uplink transmission scheme includes one of: a closed-loop beamforming transmission, an open-loop beamforming transmission, and an open-loop spatial multiplexing transmission.

16. A wireless communication apparatus, comprising:

means for receiving a downlink control message from a base station;

means for reading a control element from the downlink control message, wherein the control element indicates at least a transmission scheme and a set of interpretation rules for interpreting a set of parameters associated with the selected transmission scheme;

means for setting an uplink transmission scheme based on the transmission scheme indicated by the control element;

means for determining the set of interpretation rules indicated by the control element, wherein the set of interpretation rules is dependent on the control element; and means for interpreting the set of parameters within the downlink control message according to the set of interpretation rules.

17. The wireless communication apparatus of claim 16, wherein the control element is a rank indicator.

18. The wireless communication apparatus of claim 16, wherein the uplink transmission scheme includes one of: a closed-loop beamforming transmission, an open-loop beamforming transmission, and an open-loop spatial multiplexing transmission.

19. A non-transitory computer-readable medium having program code recorded thereon, the program code including:

program code for causing the computer to receive a downlink control message from a base station;

program code for causing the computer to read a control element from the downlink control message, wherein the control element indicates at least a transmission scheme and a set of interpretation rules for interpreting a set of parameters associated with the selected transmission scheme;

program code for causing the computer to set an uplink transmission scheme based on the transmission scheme indicated by the control element;

program code for causing the computer to determine the set of interpretation rules indicated by the control element, wherein the set of interpretation rules is dependent on the control element; and program code for causing the computer to interpret the set of parameters within the downlink control message according to the set of interpretation rules.

20. The non-transitory computer-readable medium of claim 19, wherein the control element is a rank indicator.

21. The non-transitory computer-readable medium of claim 19, wherein the uplink transmission scheme includes one of: a closed-loop beamforming transmission, an open-loop beamforming transmission, and an open-loop spatial multiplexing transmission.

22. An apparatus configured for wireless communication, the apparatus comprising:

at least one processor; and a memory coupled to the at least one processor, wherein the at least one processor is configured to:

receive a downlink control message from a base station;

read a control element from the downlink control message, wherein the control element indicates at least a transmission scheme and a set of interpretation rules for interpreting a set of parameters associated with the selected transmission scheme;

set an uplink transmission scheme based on the transmission scheme indicated by the control element;

determine the set of interpretation rules indicated by the control element, the set of interpretation rules dependent on the control element; and interpret the set of parameters within the downlink control message according to the set of interpretation rules.

23. The apparatus of claim 22, wherein the control element is a rank indicator.

24. The apparatus of claim 22, wherein the uplink transmission scheme includes one of: a closed-loop beamforming transmission, an open-loop beamforming transmission, and an open-loop spatial multiplexing transmission.

* * * * *